United States Patent
Araki et al.

(10) Patent No.: US 9,570,768 B2
(45) Date of Patent: Feb. 14, 2017

(54) FUEL CELL SYSTEM AND CONTROL METHOD THEREOF

(75) Inventors: Yasushi Araki, Gotemba (JP); Hitoshi Hamada, Gotemba (JP); Hiroaki Takeuchi, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 256 days.

(21) Appl. No.: 14/373,831

(22) PCT Filed: Mar. 8, 2012

(86) PCT No.: PCT/JP2012/001606
§ 371 (c)(1),
(2), (4) Date: Jul. 22, 2014

(87) PCT Pub. No.: WO2013/132536
PCT Pub. Date: Sep. 12, 2013

(65) Prior Publication Data
US 2015/0214561 A1   Jul. 30, 2015

(51) Int. Cl.
*H01M 8/04* (2016.01)
*H01M 8/10* (2016.01)

(52) U.S. Cl.
CPC ..... *H01M 8/04179* (2013.01); *H01M 8/04201* (2013.01); *H01M 8/04228* (2016.02); *H01M 8/04231* (2013.01); *H01M 8/04253* (2013.01); *H01M 2008/1095* (2013.01); *H01M 2250/20* (2013.01); *Y02E 60/50* (2013.01); *Y02T 90/32* (2013.01)

(58) Field of Classification Search
None
See application file for complete search history.

(56) References Cited

U.S. PATENT DOCUMENTS

| 2002/0142197 A1 | 10/2002 | Kato et al. |
| 2010/0015482 A1 | 1/2010 | Kajiwara |
| 2010/0151291 A1 | 6/2010 | Takagi et al. |

FOREIGN PATENT DOCUMENTS

| CN | 101523652 A | 9/2009 |
| JP | 2002-305017 A | 10/2002 |
| JP | 2006-190616 A | 7/2006 |
| JP | 2007-073328 A | 3/2007 |
| JP | 2008-010348 A | 1/2008 |
| JP | 2009-087568 A | 4/2009 |
| JP | 2011-044351 A | 3/2011 |
| JP | 2008-078111 A | 4/2014 |

*Primary Examiner* — Jonathan Crepeau
(74) *Attorney, Agent, or Firm* — Sughrue Mion, PLLC

(57) ABSTRACT

A fuel cell system 100 includes a fuel cell 10, a cathode gas supply system 30, a supply valve 34, an exhaust valve 43 and a controller 20. The fuel cell 10 has a supply manifold M1, an exhaust manifold M2, and a power generation area GA connected with these manifolds M1 and M2. The cathode gas supply system 30 causes a gas to be flowed into the supply manifold M1. The supply valve 34 is operable to seal the supply manifold M1, whereas the exhaust valve 43 is operable to seal the exhaust manifold M2. The controller 20 closes the supply valve 34 and the exhaust valve 43 after operation stop of the fuel cell 10 to seal the fuel cell 10 under a specified pressure and then waits for a predefined time. The controller 20 subsequently opens the supply valve 34 to move water remaining in the power generation area GA on the flow of the gas toward outside of the power generation area GA.

5 Claims, 14 Drawing Sheets

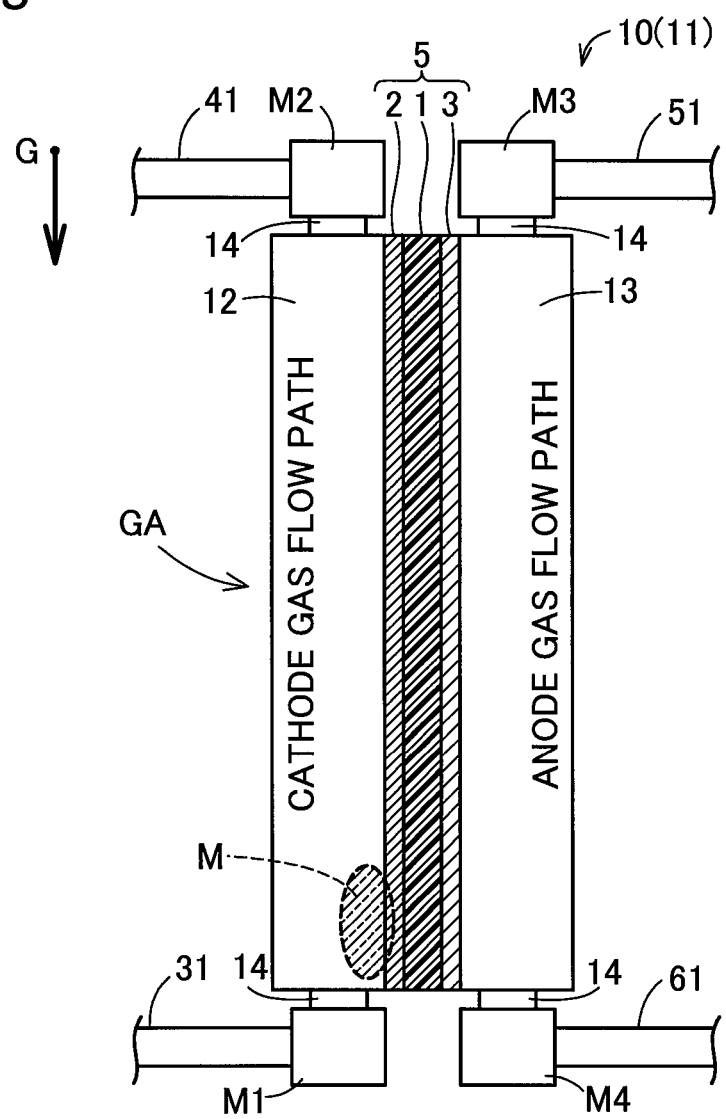

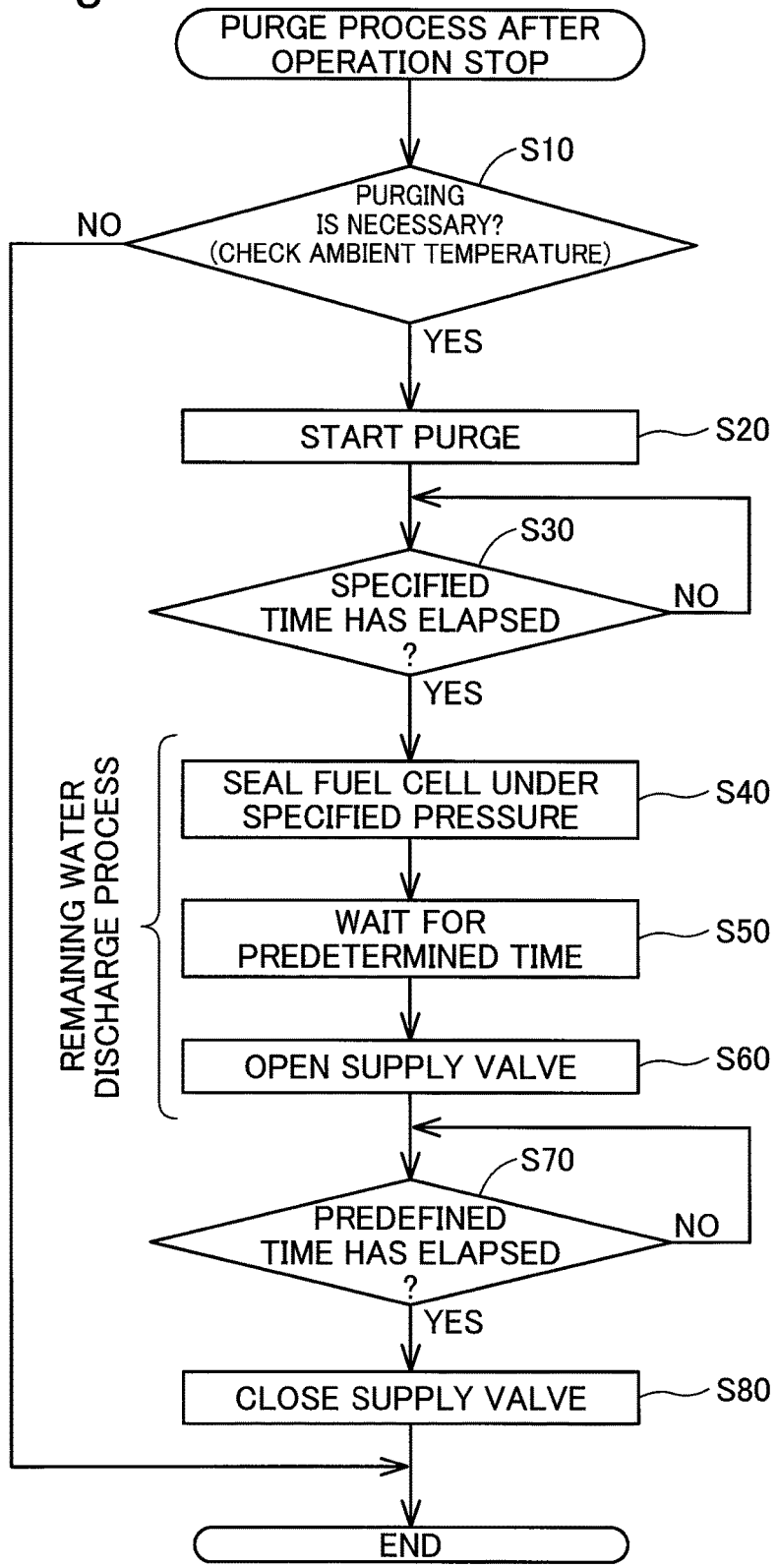

FUEL CELL SYSTEM AND CONTROL METHOD THEREOF

CROSS REFERENCE TO RELATED APPLICATIONS

This application is a National Stage of International Application No. PCT/JP2012/001606, filed Mar. 8, 2012, the contents of all of which are incorporated herein by reference in their entirety.

TECHNICAL FIELD

The present invention relates to a fuel cell.

BACKGROUND ART

A polymer electrolyte fuel cell (hereinafter simply called "fuel cell") utilizes the movement of proton through an electrolyte membrane to generate electricity. The electrolyte membrane shows good proton conductivity in the wet state. It is accordingly preferable to keep the inside of the fuel cell in the wet state during operation of the fuel cell, in order to maintain the electrolyte membrane in the adequate wet state.

After the operation stop of the fuel cell, on the other hand, the water remaining inside of the fuel cell or its connection piping is likely to be frozen in a low-temperature environment such as sub-zero environment and deteriorate starting performance of the fuel cell. A proposed technique purges the inside of the fuel cell and the connection piping on operation stop of the fuel cell, so as to reduce the water content remaining inside of the fuel cell or in the connection piping (for example, Patent Literature 1).

The prior art purge method may, however, fail to sufficiently discharge the water remaining inside of the fuel cell (especially remaining in a gas flow path arranged in a power generation area). The purge after the operation stop decreases the system efficiency, so that there is a need to minimize the purges after the operation stop.

CITATION LIST

Patent Literature

PTL 1: JP 2007-073328A
PTL 2: JP 2008-010348A
PTL 3: JP 2008-078111A
PTL 4: JP 2006-190616A

SUMMARY

Technical Problem

An object of the invention is to provide a technique which is different from the prior art method and efficiently reduces the water content remaining in a power generation area or in a gas flow path arranged in the power generation area in a fuel cell after operation stop.

Solution to Problem

The invention may be implemented by any of the following aspects and embodiments, in order to solve at least part of the above problems.

[Aspect 1]

According to Aspect 1, there is provided a fuel cell system, comprising: a fuel cell configured to have: a supply gas manifold; an exhaust gas manifold; and a power generation area where a gas flow path connected with the supply gas manifold and with the exhaust gas manifold is arranged; a gas supplier configured to cause a gas to be flowed into the supply gas manifold; a supply valve configured to seal the supply gas manifold; an exhaust valve configured to seal the exhaust gas manifold; and a controller configured to perform a remaining water discharge process which closes the supply valve and the exhaust valve after operation stop of the fuel cell, so as to seal the gas from the gas supplier in the fuel cell under a specified pressure, and subsequently opens the supply valve or the exhaust valve after waiting for a predefined time, so as to move water remaining in the gas flow path of the power generation area toward the supply gas manifold or the exhaust gas manifold.

This aspect of the fuel cell system enables the water accumulated in the gas flow path of the power generation area to be moved out of the fuel cell by utilizing the release of pressure from the fuel cell. This efficiently reduces the water content remaining in the gas flow path of the power generation area of the fuel cell by the simple technique and thereby suppresses deterioration of the starting performance of the fuel cell caused by freezing of the remaining water in a low-temperature environment.

[Aspect 2]

According to Aspect 2, there is provided the fuel cell system described in Aspect 1, wherein the fuel cell is arranged such that an upstream side of the gas flow path faces downward in direction of gravity and a downstream side of the gas flow path faces upward in the direction of gravity, where the supply gas manifold is located on a lower side in the direction of gravity and the exhaust gas manifold is located on an upper side in the direction of gravity. The remaining water discharge process opens the supply valve to move the water remaining in the gas flow path of the power generation area toward the supply gas manifold.

This aspect of the fuel cell system utilizes the action of gravity on the water in the remaining water discharge process, so as to more effectively move the water from the gas flow path of the power generation area to the outside of the power generation area.

[Aspect 3]

According to Aspect 3, there is provided the fuel cell system described in either Aspect 1 or Aspect 2, wherein the controller performs a purge process of purging inside of the fuel cell with the gas from the gas supplier after the operation stop of the fuel cell, and the controller performs the remaining water discharge process after the purge process.

This aspect of the fuel cell system moves the water, which has not been discharged by the purge process but remains in the gas flow path of the power generation area, out of the power generation area by the remaining water discharge process and thereby suppresses the gas flow path of the power generation area from being blocked by freezing of the remaining water.

[Aspect 4]

According to Aspect 4, there is provided the fuel cell system described in Aspect 3, further comprising: a water content detector configured to detect a water content remaining inside of the fuel cell on the operation stop, wherein the controller determines whether (i) both the purge process and the remaining water discharge process are to be performed or (ii) only the remaining water discharge process is to be performed without the purge process, according to the detected water content.

This aspect of the fuel cell system selects the adequate processing according to the water content remaining inside of the fuel cell. This suppresses the purge process from being performed unnecessarily and thereby improves the system efficiency.

[Aspect 5]

According to Aspect 5, there is provided the fuel cell system described in any of Aspects 1 to 4, wherein the controller repeats the remaining water discharge process a plurality of times.

This aspect of the fuel cell system more effectively reduces the water content remaining in the gas flow path of the power generation area by the remaining water discharge processes.

[Aspect 6]

According to Aspect 6, there is provided a control method of a fuel cell system, the fuel cell system comprising a fuel cell configured to have: a supply gas manifold; an exhaust gas manifold; and a power generation area where a gas flow path connected with the supply gas manifold and with the exhaust gas manifold is arranged. The control method comprises the steps of: (a) sealing the supply gas manifold and the exhaust gas manifold after operation stop of the fuel cell and waiting for a predefined time with keeping inside of the fuel cell at a specified pressure; and (b) releasing the supply gas manifold or the exhaust gas manifold, so as to move water remaining in the gas flow path of the power generation area toward the supply gas manifold or the exhaust gas manifold.

This control method of the fuel cell system enables the water content remaining in the gas flow path of the power generation area of the fuel cell to be effectively reduced by the technique having relatively small energy consumption.

The invention may be implemented by various aspects: for example, a fuel cell system, a vehicle equipped with the fuel cell system, a purge method of purging a fuel cell performed in such a system or in such a vehicle, a control method and a control apparatus of controlling such a system or such a vehicle, a computer program that causes a computer to implement the functions of such a purge method, such a control method or such a control apparatus, and a storage medium in which such a computer program is stored.

BRIEF DESCRIPTION OF DRAWINGS

FIGS. 4A and 4B are diagrams schematically illustrating the internal state of the fuel cell when a purge gas is flowed from a supply manifold;

FIG. 5 is a chart showing a procedure of a purge process performed after operation stop of the fuel cell;

DESCRIPTION OF EMBODIMENTS

A. First Embodiment

Figure 1:
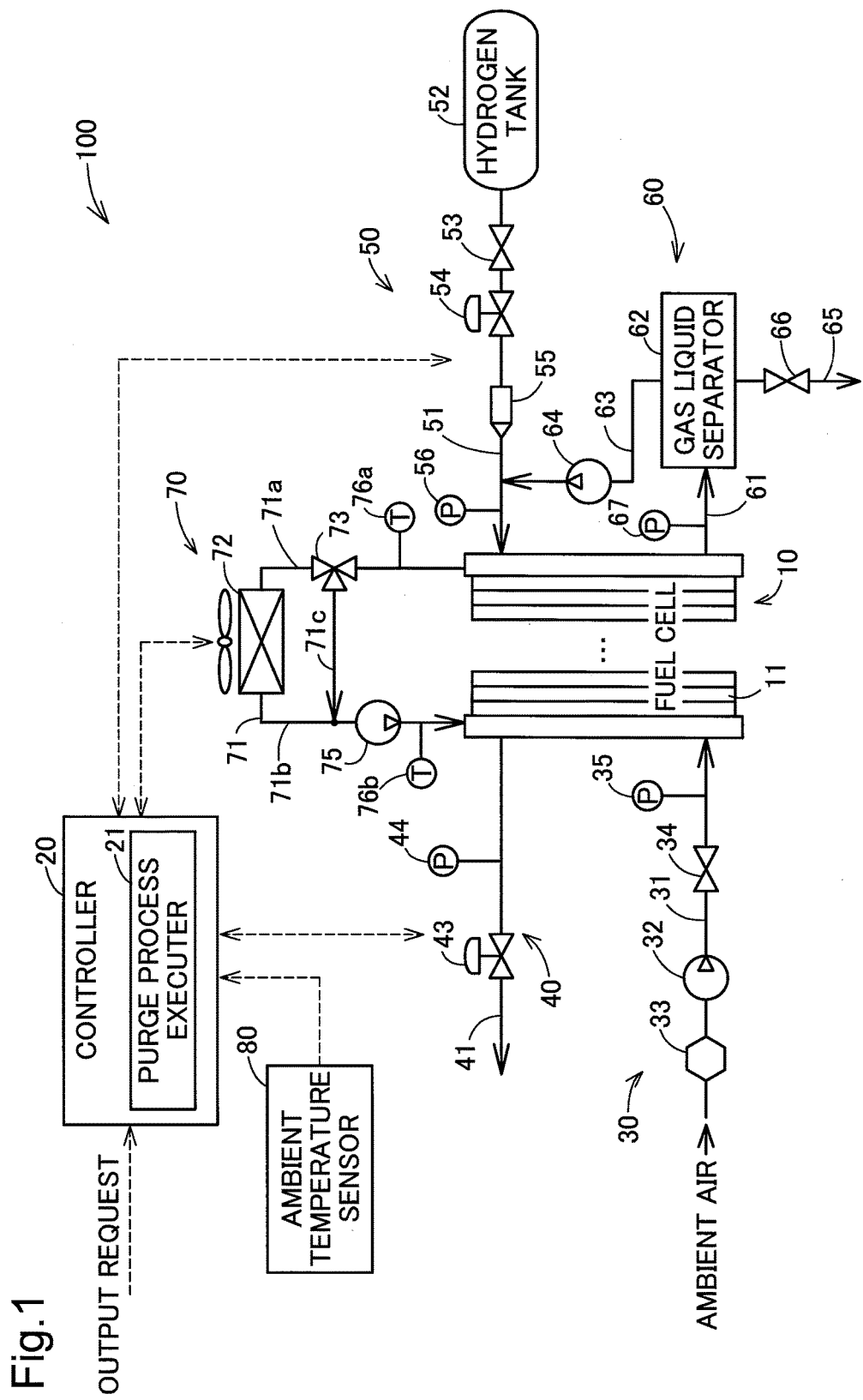
FIG. 1 is a schematic diagram illustrating the configuration of a fuel cell system.

FIG. 1 is a schematic diagram illustrating the configuration of a fuel cell system according to one embodiment of the invention. This fuel cell system 100 is mounted on a fuel cell vehicle and outputs electric power used as driving force, in response to the driver's request. The fuel cell system 100 includes a fuel cell 10, a controller 20, a cathode gas supply system 30, a cathode gas exhaust system 40, an anode gas supply system 50, an anode gas circulation and exhaust system 60 and a cooling medium circulation and supply system 70.

The fuel cell 10 is a polymer electrolyte fuel cell that receives supplies of hydrogen (anode gas) and the air (cathode gas) as reactive gases to generate electricity. The fuel cell 10 has a stack structure formed by stacking a plurality of unit cells 11 that are power generation elements. The fuel cell 10 has manifolds (not shown) for the reactive gases and the cooing medium which are flow paths formed along a stacking direction of the fuel cell 10 to be connected with the respective unit cells 11. The structure of the fuel cell 10 will be described later.

The controller 20 is implemented by a microcomputer including a central processing unit and a main storage unit. The controller 20 serves as a power generation controller to control the respective components described below and thereby cause the fuel cell 10 to generate electric power corresponding to an output request. The controller 20 also serves as a purge process executer 21.

The purge process executer 21 controls the respective components of the fuel cell system 100 after the operation stop of the fuel cell 10 to perform a purge process, in order to reduce the water content remaining in the fuel cell 10 and the water content adhering to, for example, the piping and valves of the fuel cell system 100. The procedure of the purge process performed by the purge process executer 21 will be described later.

The cathode gas supply system 30 includes a cathode gas piping 31, an air compressor 32, an air flow meter 33 and a supply valve 34. The cathode gas piping 31 is provided as a piping connected with a supply manifold on the cathode side of the fuel cell 10. The air compressor 32 is connected with the supply manifold on the cathode side of the fuel cell 10 via the cathode gas piping 31 to supply the ambient air taken in and compressed as the cathode gas to the fuel cell 10.

The air flow meter 33 is located in the upstream of the air compressor 32 to measure the amount of the ambient air taken in by the air compressor 32 and send the measurement value to the controller 20. The controller 20 actuates the air compressor 32 based on this measurement value and thereby controls the supply amount of the air to the fuel cell 10.

The supply valve 34 is placed between the air compressor 32 and the fuel cell 10. The supply valve 34 is opened and closed in response to a command from the controller 20 to control the flow of the air to the fuel cell 10. The cathode gas supply system 30 also may include a humidifier configured to humidify the air to be supplied to the fuel cell 10.

The cathode gas exhaust system 40 includes a cathode off-gas piping 41, an exhaust valve 43 and a pressure measurement unit 44. The cathode off-gas piping 41 is provided as a piping connected with an exhaust manifold on the cathode side of the fuel cell 10 to discharge a cathode off-gas out of the fuel cell system 100.

The exhaust valve 43 is a pressure regulator configured to regulate the pressure of the cathode off-gas in the cathode off-gas piping 41 (back pressure on the cathode side of the fuel cell 10). The valve opening position of the exhaust valve 43 is controlled by the controller 20. The pressure measurement unit 44 is located in the upstream of the exhaust valve 43 to measure the pressure of the cathode off-gas and send the measurement value to the controller 20.

The anode gas supply system 50 includes an anode gas piping 51, a hydrogen tank 52, an on-off valve 53, a regulator 54, a hydrogen supply device 55 and a pressure measurement unit 56. The hydrogen tank 52 is connected with a supply manifold on the anode side of the fuel cell 10 via the anode gas piping 51 to supply hydrogen filled in the hydrogen tank 52 as the anode gas to the fuel cell 10.

The on-off valve 53, the regulator 54, the hydrogen supply device 55 and the pressure measurement unit 56 are provided on the anode gas piping 51 in this order from the upstream side (hydrogen tank 52-side). The on-off valve 53 is opened and closed in response to a command from the controller 20 to control the inflow of hydrogen from the hydrogen tank 52 to the upstream side of the hydrogen supply device 55. The regulator 54 is a pressure reducing valve configured to regulate the pressure of hydrogen on the upstream side of the hydrogen supply device 55. The valve opening position of the regulator 54 is controlled by the controller 20.

The hydrogen supply device 55 is implemented, for example, by an injector that is an electromagnetically-driven on-off valve. The pressure measurement unit 56 measures the pressure of hydrogen on the downstream side of the hydrogen supply device 55 and sends the measurement value to the controller 20. The controller 20 controls the hydrogen supply device 55 based on the measurement value of the pressure measurement unit 56, so as to control the amount of hydrogen to be supplied to the fuel cell 10.

The anode gas circulation and exhaust system 60 includes an anode off-gas piping 61, a gas liquid separator 62, an anode gas circulation piping 63, a hydrogen circulation pump 64, an anode water discharge piping 65, a drain valve 66 and a pressure measurement unit 67. The anode off-gas piping 61 is provided as a piping that connects an exhaust manifold on the anode side of the fuel cell 10 with the gas liquid separator 62 to introduce an anode off-gas including unreacted gases (for example, hydrogen and nitrogen) that have not been used for the electricity generating reaction, to the gas liquid separator 62.

The gas liquid separator 62 is connected with the anode gas circulation piping 63 and the anode water discharge piping 65. The gas liquid separator 62 separates a gas component included in the anode off-gas from a fluid and introduces the gas component to the anode gas circulation piping 63 while introducing the fluid to the anode water discharge piping 65.

The anode gas circulation piping 63 is connected with the anode gas piping 51 at a position in the downstream of the hydrogen supply device 55. The hydrogen circulation pump 64 is provided on the anode gas circulation piping 63. Hydrogen included in the gas component separated by the gas liquid separator 62 is fed to the anode gas piping 51 by this hydrogen circulation pump 64. The fuel cell system 100 circulates hydrogen included in the anode off-gas and resupplies the hydrogen to the fuel cell 10 in this manner during operation of the fuel cell 10, thus improving the use efficiency of hydrogen.

The anode water discharge piping 65 is provided as a piping to discharge the fluid separated by the gas liquid separator 62 out of the fuel cell system 100. The drain valve 66 is provided on the anode water discharge piping 65 and is opened and closed in response to a command from the controller 20. The controller 20 normally closes the drain valve 66 during operation of the fuel cell system 100 and opens the drain valve 66 at a predetermined water discharge timing or at a discharge timing of an inert gas included in the anode off-gas.

The pressure measurement unit 67 of the anode gas circulation and exhaust system 60 is provided on the anode off-gas piping 61. The pressure measurement unit 67 measures the pressure of the anode off-gas (back pressure on the anode side of the fuel cell 10) in the vicinity of an outlet of a hydrogen manifold of the fuel cell 10 and sends the measurement value to the controller 20.

The cooling medium circulation and supply system 70 includes a cooling medium piping 71, a radiator 72, a three-way valve 73, a cooling medium circulation pump 75 and first and second cooling medium temperature measurement units 76a and 76b. The cooling medium piping 71 is provided as a piping to circulate a cooling medium for cooling the fuel cell 10 and includes an upstream-side pipe 71a, a downstream-side pipe 71b and a bypass pipe 71c.

The upstream-side pipe 71a connects an outlet manifold for the cooling medium provided in the fuel cell 10 with an inlet of the radiator 72. The downstream-side pipe 71b connects an inlet manifold for the cooling medium provided in the fuel cell 10 with an outlet of the radiator 72. The bypass pipe 71c has one end connected with the upstream-side pipe 71a via the three-way valve 73 and the other end connected with the downstream-side pipe 71b. The controller 20 controls opening and closing of the three-way valve 73 to adjust the amount of inflow of the cooling medium to the bypass pipe 71c and thereby control the amount of inflow of the cooling medium to the radiator 72.

The radiator 72 is provided on the cooling medium piping 71. The radiator 72 exchanges heat between the cooling medium flowing through the cooling medium piping 71 and the ambient air, so as to cool down the cooing medium. The cooling medium circulation pump 75 is provided on the downstream side (cooling medium inlet side of the fuel cell 10) of the connecting position of the bypass pipe 71c in the downstream-side pipe 71b and is actuated in response to a command from the controller 20.

The first and second cooling medium temperature measurement units 76a and 76b are respectively provided on the upstream-side pipe 71a and the downstream-side pipe 71b and send the respective measurement values to the controller 20. The controller 20 determines the operating temperature of the fuel cell 10 from a difference between the measurement values of the respective cooling medium temperature measurement units 76a and 76b and controls the rotation speed of the cooling medium circulation pump 75 based on the determined operating temperature to adjust the operating temperature of the fuel cell 10.

The fuel cell system 100 further includes an ambient temperature sensor 80 configured to measure the temperature outside of the fuel cell vehicle (ambient temperature). The ambient temperature sensor 80 sends the measurement result to the controller 20. The purge process executer 21 uses the detected temperature of the ambient temperature sensor 80 to determine the necessity or unnecessity of the purge process.

The fuel cell system 100 also includes a secondary battery and a DC-DC converter, which are neither illustrated nor described in detail. The secondary battery accumulates the electric power output from the fuel cell 10 and the regenerative electric power and serves, in combination with the fuel cell 10, as the power source. The DC-DC converter is configured to control charging and discharging of the secondary battery and the output voltage of the fuel cell 10. The respective components of the fuel cell system 100 described above can be driven even after the operation stop of the fuel cell 10 by using the electric power accumulated in the secondary battery.

Figure 2:
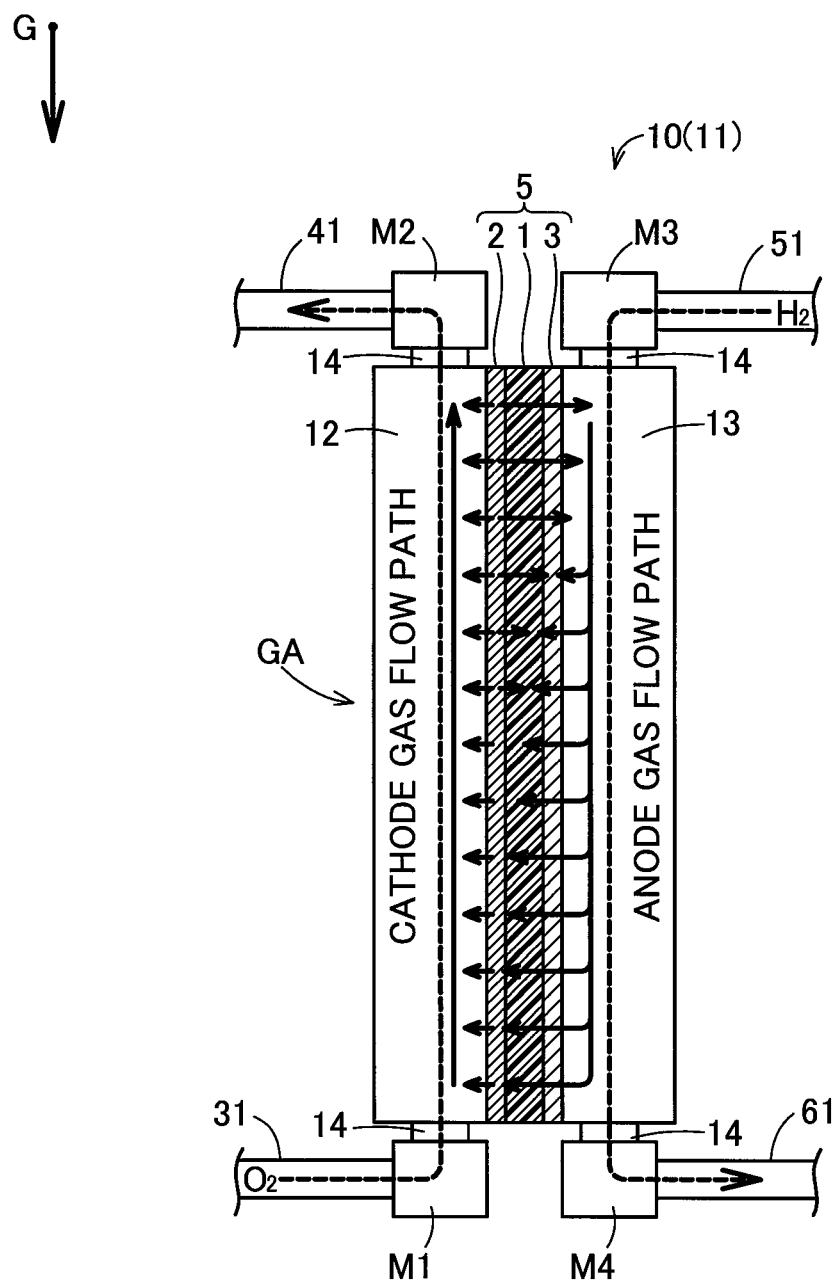
FIG. 2 is a diagram illustrating the flows of reactive gases and the movement of water in a fuel cell.

FIG. 2 is a diagram illustrating the structure of the fuel cell 10 included in the fuel cell system 100. As a matter of convenience, only one unit cell 11 of the fuel cell 10 is illustrated in FIG. 2, with omission of the other unit cells 11 from the illustration. FIG. 2 also shows the respective gas pipings 31, 41, 51 and 61 connected with the fuel cell 10. FIG. 2 further shows an arrow G representing the direction of gravity when the fuel cell 10 is mounted on the fuel cell vehicle, broken-line arrows representing the flow of gas in the unit cell 11 during power generation and solid-line arrows representing the moving pathway of water.

The unit cell 11 of the fuel cell 10 has a membrane electrode assembly 5 where a first electrode 2 and a second electrode 3 are placed on the respective surfaces of an electrolyte membrane 1. The electrolyte membrane 1 is made of, for example, a fluorine-based ion exchange resin and has good proton conductivity in the wet condition. The first and second electrodes 2 and 3 are formed as coating films of a catalyst ink which is a mixed dispersion of conductive particles having a catalyst such as platinum supported thereon and an electrolyte identical with or similar to that of the electrolyte membrane 1.

Separators (not shown) that are plate base materials having electrical conductivity are placed on the respective sides of the membrane electrode assembly 5. A first gas flow path 12 and a second gas flow path 13 which the reactive gases flow through are respectively formed between the first and second electrodes 2 and 3 of the membrane electrode assembly 5 and the respective separators. More specifically, the first and second gas flow paths 12 and 13 may be structured by passage grooves formed on the surfaces of the respective separators, by passage members such as expanded metal placed between the separators and the respective electrodes 2 and 3 or by porous members such as carbon fibers placed on the surfaces of the respective electrodes 2 and 3.

The fuel cell 10 includes supply manifolds M1 and M3 configured to supply the reactive gases to the respective power generation elements 11 and exhaust manifolds M2 and M4 configured to discharge the off gases of the respective unit cells 11. The supply manifolds M1 and M3 and the exhaust manifolds M2 and M4 are arranged to face each other across an area where the membrane electrode assembly 5 is placed in each unit cell 11. Each of the manifolds M1 to M4 is connected with an inlet or an outlet of the first or the second gas flow path 12 or 13 via a connection path 14, as described below more specifically.

The supply manifold M1 is connected with the inlet of the first gas flow path 12 and is also connected with the cathode gas piping 31. The exhaust manifold M2 is connected with the outlet of the first gas flow path 12 and is also connected with the cathode off-gas piping 41. The supply manifold M3 is connected with the inlet of the second gas flow path 13 and is also connected with the anode gas piping 51. The exhaust manifold M4 is connected with the outlet of the second gas flow path 13 and is also connected with the anode off-gas piping 61.

In the description hereinafter, the first electrode 2 is also called "cathode 2", and the first gas flow path 12 is also called "cathode gas flow path 12." The second electrode 3 is also called "anode 3", and the second gas flow path 13 is also called "anode gas flow path 13." In each unit cell 11, an area which the membrane electrode assembly 5 is placed in, which are placed between the supply manifolds M1 and M3 and the exhaust manifolds M2 and M4, and which include the first and the second gas flow paths 12 and 13 is called "power generation area GA".

In the fuel cell 10, the arrangement of the supply manifold M1 and the exhaust manifold M2 for the cathode 2 is reversed to the arrangement of the supply manifold M3 and the exhaust manifold M4 for the anode 3. In the fuel cell system 100, the fuel cell 10 is arranged such that the cathode 2-side inlet of the power generation area GA connected with the supply manifold M1 faces downward in the direction of gravity and the cathode 2-side outlet of the power generation area GA connected with the exhaust manifold M2 faces upward in the direction of gravity.

This arrangement causes the air to flow in a direction reverse to the direction of gravity on the cathode 2-side of the power generation area GA in each unit cell 11, while causing hydrogen to flow in the opposite direction to the direction of the air flow, i.e., along the direction of gravity on the anode 3-side (broken-line arrows). The water produced on the cathode 2 moves as described below.

The water produced on the cathode 2 is moved on the flow of the air in the cathode gas flow path 12 from the supply manifold M1-side (upstream side) to the exhaust manifold M2-side (downstream side). Accordingly, on the cathode 2-side, the downstream side of the cathode gas flow path 12 has a greater water content than that of the upstream side of the cathode gas flow path 12. The inlet of the cathode gas flow path 12 is arranged to face downward in the direction of gravity. This arrangement suppresses the movement of water toward the downstream side of the cathode gas flow path 12 by the action of gravity and thereby suppresses the upstream side of the cathode gas flow path 12 from being dried excessively.

The water produced on the cathode 2 is moved to the anode 3-side across the electrolyte membrane 1. More specifically, there is a large water content on the downstream side of the cathode gas flow path 12 on the cathode 2-side, so that the water content moving from the cathode 2-side toward the anode 3-side increases on the upstream side of the anode gas flow path 13. The water content tends to decrease, on the contrary, on the upstream side of the cathode gas flow path 12, so that the water content moving from the anode 3-side toward the cathode 2-side increases on the downstream side of the anode gas flow path 13.

During operation of the fuel cell 10, this arrangement creates such water content slopes that the water content increases on the respective downstream sides of the gas flow paths 12 and 13 on the cathode 2-side and the anode 3-side, and thereby forms a circulation pathway of water over the entire power generation area GA. This accordingly maintains the membrane electrode assembly 5 in the good wet condition during operation of the fuel cell 10.

After the operation stop of the fuel cell 10, a large water content may remain inside of the fuel cell 10 or inside of the gas pipings 31, 41, 51 and 61 connected to the fuel cell 10. In a low-temperature environment, for example, sub-zero environment, the remaining water may be frozen to block the pathway of the reactive gas inside of the fuel cell 10 or in the gas pipings 31, 41, 51 and 61. This may result in deteriorating the starting performance of the fuel cell 10.

It is accordingly desirable to perform a purge, in order to remove or reduce such remaining water after the operation stop of the fuel cell 10. In the description hereof, "after the operation stop of the fuel cell 10" denotes the state after the driver stops driving the vehicle (ignition-off state) and the state that the fuel cell 10 stops outputting electric power in response to the driver's request.

The inventors have, however, found that a certain amount of water is not dischargeable but still remains inside of the fuel cell 10 even when the fuel cell 10 is purged for a sufficient time. The inventors have also found that freezing of such remaining water is likely to deteriorate the starting performance of the fuel cell 10 in sub-zero environment.

Figure 3:
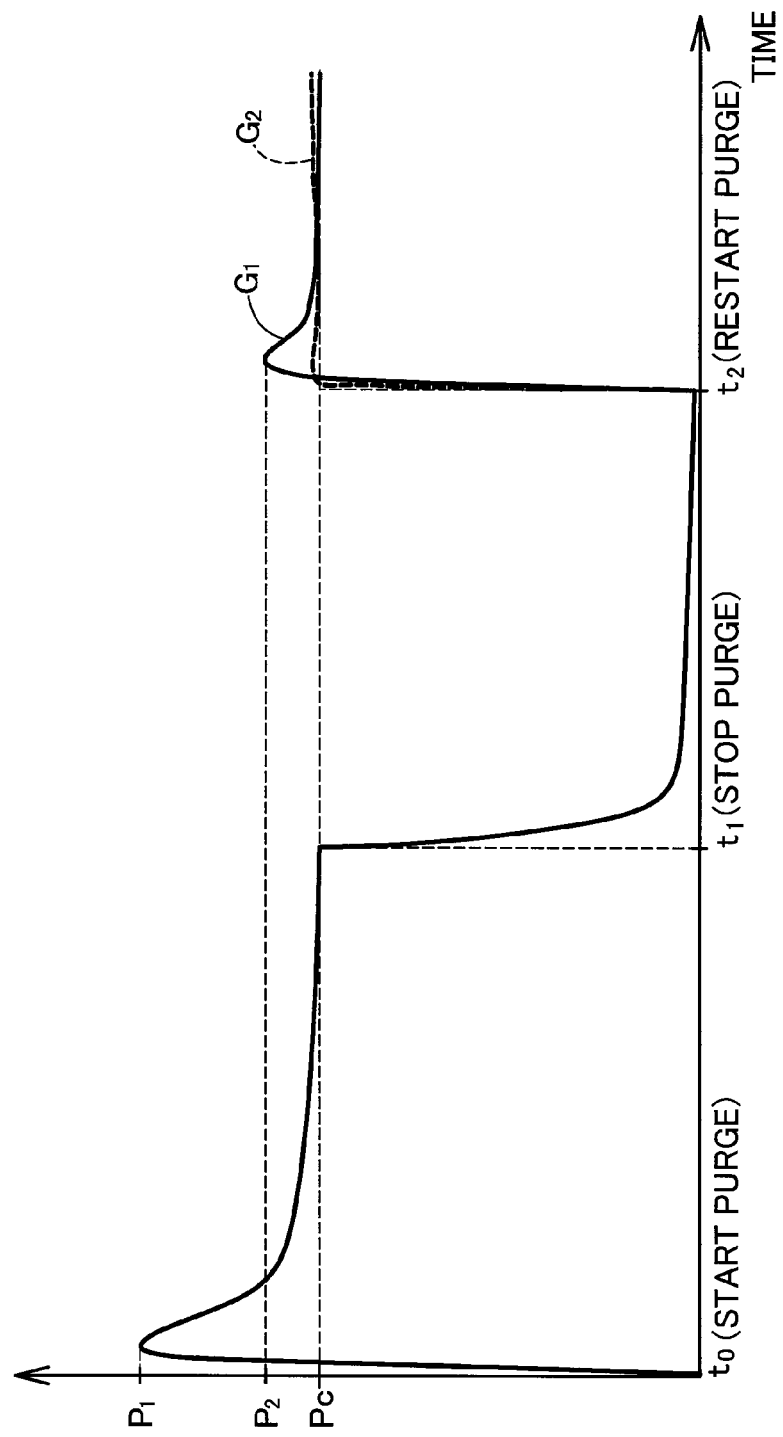
FIG. 3 is a chart showing temporal changes of pressure loss in a cathode gas flow path by purges performed in the fuel cell after operation stop.

FIG. 3 shows graphs obtained by an experiment performed by the inventors of the present invention and specifically shows graphs representing temporal changes of pressure loss in the cathode gas flow path 12 by purges in the fuel cell 10 after operation stop. The inventors of the present invention performed purges twice at an interval on the cathode side of the fuel cell 10 after power generation of the fuel cell 10 and measured a temporal change of pressure loss in the cathode gas flow path 12.

In this experiment, the fuel cell 10 was arranged such that the supply manifold M1 on the cathode side faced downward in the direction of gravity and the exhaust manifold M2 on the cathode side faced upward in the direction of gravity. This experiment measures a weight change of the fuel cell 10 before and after the purges, so as to confirm discharge of water from the fuel cell 10.

A solid-line graph $G_1$ shows a temporal change of the pressure loss when a purge gas is fed from the supply manifold M1 (i.e., when the purge gas is flowed in a direction reverse to the direction of gravity in the power generation area GA). A broken-line graph $G_2$ shows a temporal change of the pressure loss when the purge gas is fed from the exhaust manifold M2 (i.e., when the purge gas is flowed along the direction of gravity in the power generation area GA). In the experiment, a purge was started at a time t0 and was stopped at a time $t_1$. A purge was then restarted at a time $t_2$.

On the start of a first purge, the pressure loss temporarily increased to a peak value $P_1$ in the initial stage and then sharply decreased to converge to a certain value Pc in both the graphs. The temporary increase of the pressure loss to the peak value $P_1$ during the first purge is attributed to that the water on the cathode side is expelled at a time by the purge gas. The subsequent convergence of the pressure loss to the convergence value Pc indicates discharge of most of the water which may interfere with the flow of the purge gas.

On the start of a second purge, the pressure loss shown by the solid-line graph $G_1$ temporarily increased to a peak value $P_2$, which was smaller than the peak value $P_1$ during the first purge ($P_2<P_1$), in the initial stage and then converged to the convergence value Pc again. Unlike the first purge, however, no discharge of water out of the fuel cell 10 was detected during the second purge.

After the second purge, a plurality of purges were further repeated. During such additional purges, no discharge of water out of the fuel cell 10 was detected, but a temporary increase of the pressure loss to the peak value $P_2$ was observed, like the second purge. The pressure loss shown by the broken-line graph $G_2$, on the other hand, converged to the convergence value Pc again without showing any temporary increase during the second purge.

As described above, the pressure loss was temporarily increased during the second purge in the power generation area GA of the fuel cell 10 in the case that the purge gas was flowed in the direction reverse to the direction of gravity, unlike the case that the purge gas is flowed along the direction of gravity. This temporary increase of the pressure loss during the second purge is attributed to the movement of water inside the fuel cell 10 as described below.

Figure 4A:
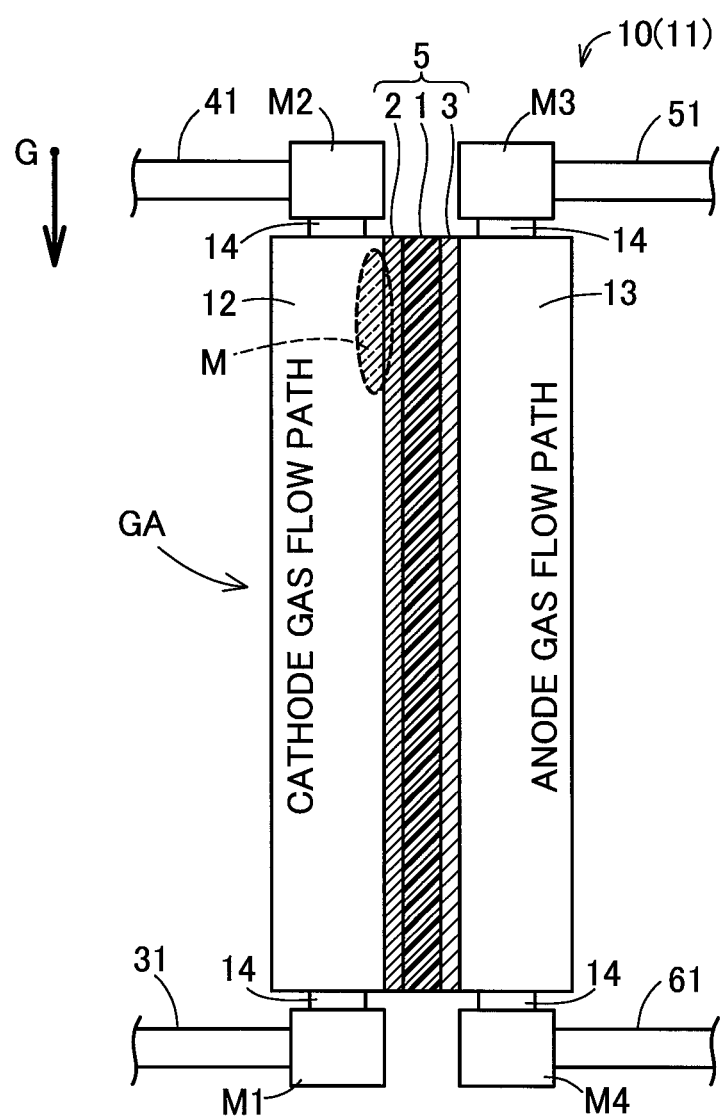

FIGS. 4A and 4B are diagrams schematically illustrating the internal state of the fuel cell 10 when the purge gas is flowed from the supply manifold M1. FIGS. 4A and 4B respectively show the movement of water M, in addition to the diagrams of the fuel cell 10 similar to FIG. 2. FIG. 4A shows the internal state of the fuel cell 10 immediately after the stop of the first purge, and FIG. 4B shows the internal state of the fuel cell 10 on the start of the second purge.

When the purge gas is flowed from the supply manifold M1 to the fuel cell 10 after the operation stop, a certain amount of water is discharged out of the fuel cell 10. Some water M is, however, not discharged but still remains and is accumulated on the downstream side of the power generation area GA (upper side in the direction of gravity) (FIG. 4A). On the start of the subsequent second purge, the water M accumulated on the downstream side of the power generation area GA has moved to the upstream side by the action of gravity. The inlet side of the cathode gas flow path 12 accordingly has a higher pressure loss (FIG. 4B).

This causes a temporary increase of the pressure loss during the second purge, as shown by the solid-line graph $G_1$ of FIG. 3. During the second purge, the water M accumulated on the upstream side is pressed back to the downstream side to the state of FIG. 4B. Such repeated purges in the direction reverse to the direction of gravity causes the water M to be moved inside of the power generation area GA by the action of gravity force, but has difficulty in discharging out the water M.

When the purge gas is flowed from the exhaust manifold M2 along the direction of gravity in the power generation area GA, on the other hand, there is no accumulation of water M by the action of gravity shown in FIG. 4A. This causes no temporary pressure loss during the second purge as shown by the broken-line graph $G_2$ of FIG. 3.

In the fuel cell system 100 of the embodiment, when the fuel cell 10 after the operation stop is purged with the cathode gas used as the purge gas, the water is likely to be accumulated on the upstream side of the power generation area GA as shown in FIG. 4B. Freezing of this water interferes with the flow of the air and may cause difficulty in restarting the fuel cell 10. In the fuel cell system 100 of the embodiment, the purge process executer 21 accordingly performs a purge process described below after operation stop of the fuel cell 10, so as to effectively reduce the remaining water content with relatively small energy consumption.

FIG. 5 is a flowchart showing a procedure of purge process performed after operation stop of the fuel cell 10. At step S10, the purge process executer 21 performs an ambient temperature check to determine the necessity or unnecessity of purging. More specifically, when the ambient temperature detected by the ambient temperature sensor 80 is equal to or lower than a specified temperature (for example, 10° C.), the purge process executer 21 determines the necessity of purging on the assumption that the ambient temperature is likely to reach a sub-zero temperature and the water in the fuel cell 10 is likely to be frozen.

When it is determined at step S10 that there is little necessity of purging due to the high ambient temperature, the purge process executer 21 does not start a purge but terminates this purge process. This suppresses unnecessary purges when it is unlikely to freeze water inside of the fuel cell 10, due to the high ambient temperature, thus suppressing reduction of the system efficiency.

When it is determined at step S10 that there is high necessity of purging, the purge process executer 21 starts a purge in the flow path on the cathode side of the fuel cell 10 at step S20. More specifically, the purge process executer 21 opens the supply valve 34 and the exhaust valve 43 and actuates the air compressor 32 to cause the compressed air as the purge gas to be flowed through the cathode gas piping 31 to the fuel cell 10.

The purge process executer 21 continues the purge of step S20 until elapse of a specified time (for example, about several seconds to several tens of seconds) (step S30). At steps S20 and S30, the purge process executer 21 may simultaneously perform a purge on the anode side of the fuel cell 10. More specifically, the purge process executer 21 may actuate the hydrogen circulation pump 64 in the state that the hydrogen supply from the hydrogen tank 52 is stopped, so as to circulate the hydrogen and the inert gas remaining in the system and thereby purge the anode side of the fuel cell 10.

At steps S40 to S60, the purge process executer 21 performs a remaining water discharge process to discharge the water that is not discharged by the purge of steps S20 and S30 but remains inside of the fuel cell 10. The following describes the details of the remaining water discharge process.

Figure 6A:
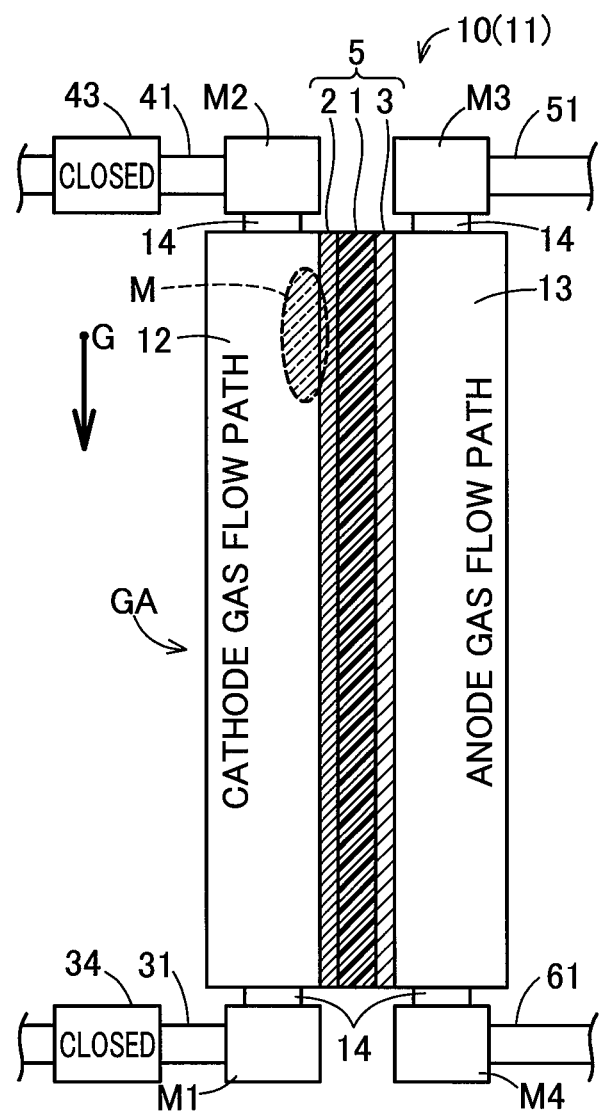
FIGS. 6A to 6C are diagrams illustrating a remaining water discharge process performed during the purge process.
Figure 6B:
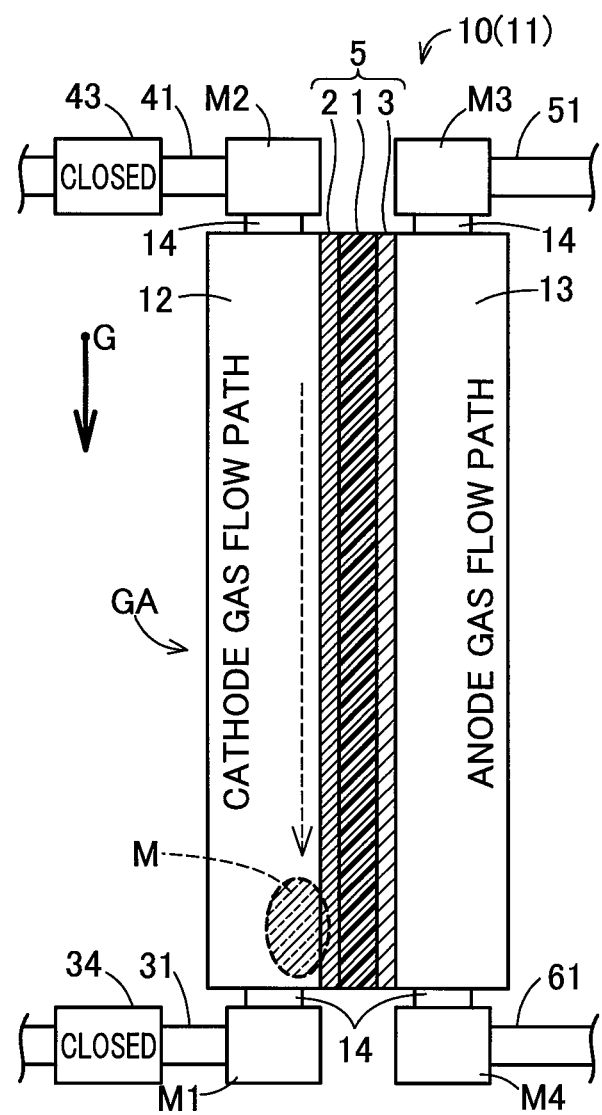
Figure 6C:
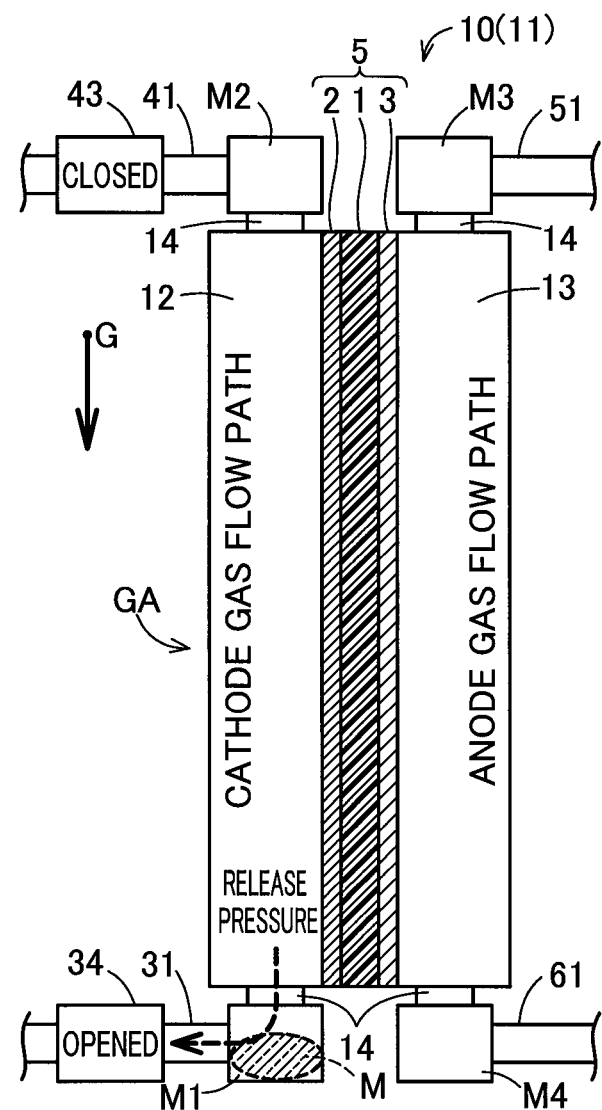

FIGS. 6A to 6C are diagrams illustrating the remaining water discharge process of steps S40 to S60. FIGS. 6A to 6C sequentially illustrate the internal state of the fuel cell 10 in the order of steps during the remaining water discharge process. FIGS. 6A to 6C show the fuel cell 10 by the diagram similar to FIG. 2. The supply valve 34 and the exhaust valve 43 are additionally illustrated in FIGS. 6A to 6C.

In the fuel cell 10 immediately after steps S20 and S30, water M is accumulated on the downstream side of the cathode gas flow path 12 (i.e., upper side in the direction of gravity) inside of the fuel cell 10 (FIG. 6A) as described above with reference to FIG. 4A. At step S40, the remaining water discharge process seals the fuel cell 10 with leaving a certain pressure inside of the fuel cell 10. More specifically, the remaining water discharge process closes the exhaust valve 43 on the cathode off-gas piping 41, subsequently stops the air compressor 32 actuated for purging, and closes the supply valve 34 on the cathode gas piping 31.

At step S50, the remaining water discharge process waits with keeping the high internal pressure of the fuel cell 10 for a predetermined time until the water M accumulated on the downstream side of the cathode gas flow path 12 is moved to the upstream side (i.e., lower side in the direction of gravity) (FIG. 6B). The wait time at step S50 is preferably a sufficient time for the water M to move to the upstream side of the cathode gas flow path 12 and is specifically, for example, about several seconds to several minutes.

At step S60, the remaining water discharge process opens the supply valve 34 on the cathode gas piping 31 to cause the compressed air in the cathode gas flow path 12 of the fuel cell 10 to be flowed into the cathode gas piping 31 (FIG. 6C). The flow of the air into the cathode gas piping 31 accompanied with such pressure release causes the water M accumulated on the upstream side of the cathode gas flow path 12 to pass through the connection path 14 outside of the power generation area GA and move to at least the supply manifold M1. In order to prevent the supply valve 34 from being frozen, it is preferable to limit the movement of the water M up to before the supply valve 34.

At step S70, the purge process executer 21 waits with keeping the supply valve 34 open for a predefined time (for example, about 1 second to several seconds) until the remaining water is discharged out of the power generation area GA. The purge process executer 21 closes the supply valve 34 at step S80 and terminates the purge process.

After this purge process, the water discharged out of the power generation area GA by the remaining water discharge process remains in the supply manifold M1 and in the cathode gas piping 31. According to this embodiment, however, the purge is performed at steps S20 and S30, prior to the remaining water discharge process. The amount of water discharged by the remaining water discharge process is accordingly less than the amount that blocks the supply manifold M1 and the cathode gas piping 31.

Figure 7:
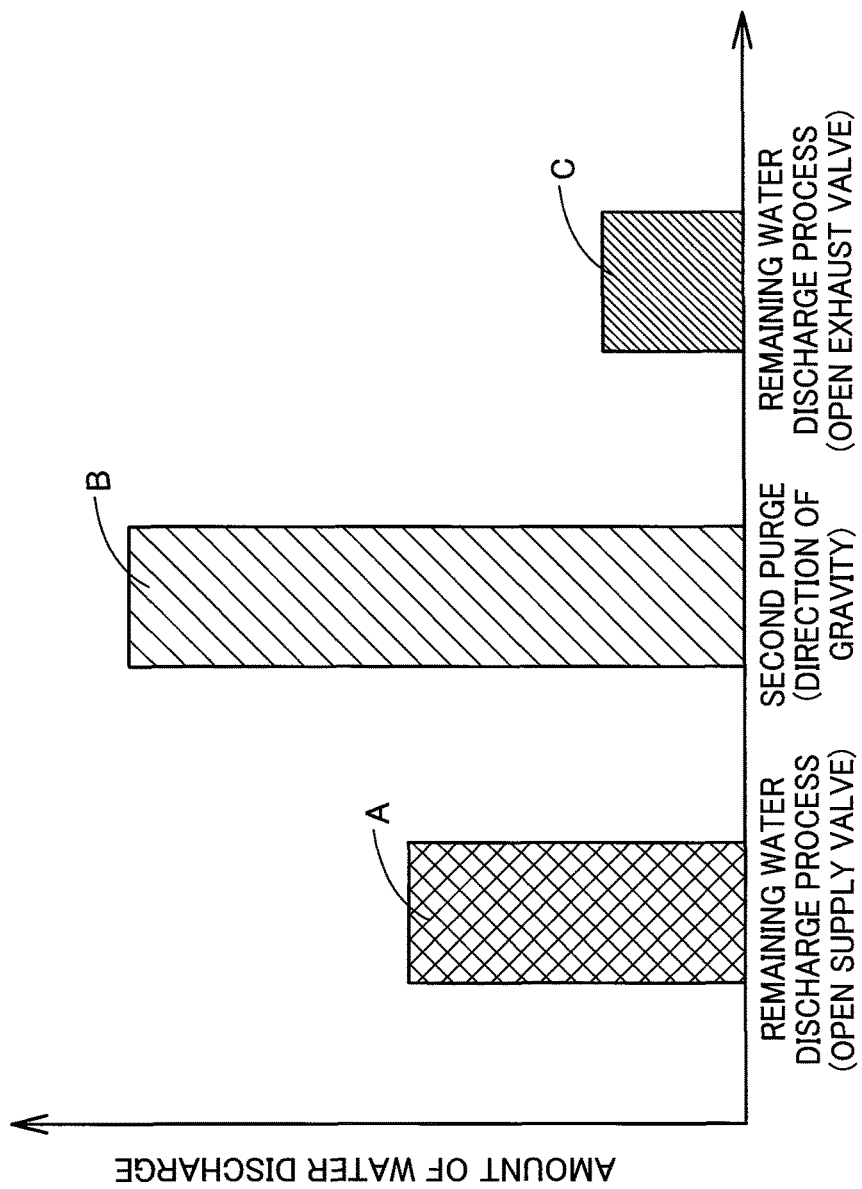
FIG. 7 is a chart showing discharge amounts of water by the remaining water discharge process.

FIG. 7 shows graphs obtained by an experiment performed by the inventors of the present invention and specifically shows graphs representing discharge amounts of water by the remaining water discharge process. The inventors of the present invention performed a purge of the fuel cell 10 after the operation stop, subsequently performs the remaining water discharge process described above, and measured the discharge amount of water discharged out of the power generation area GA by the remaining water discharge process (bar graph A).

The purging performed prior to the remaining water discharge process fed the purge gas from the supply manifold M1 to flow the purge gas in the direction reverse to the direction of gravity in the power generation area GA and continued purging until detection of no further discharge of water. The remaining water discharge process waited for 60 seconds with keeping the internal pressure of the fuel cell 10 to 200 kPa (abs) and subsequently released the pressure to decrease the internal pressure of the fuel cell 10 to 100 kPa (abs).

The inventors of the present invention also measured the discharge amount of water when a second purge was performed for the purged fuel cell 10 described above for 60 seconds with inverting the flow direction of the purge gas (bar graph B) as a comparative example. The inventors of the prevent invention additionally measured the discharge amount of water by a remaining water discharge process that opened the exhaust valve 43 on the cathode off-gas piping 41 to release the pressure upward in the direction of gravity (bar graph C) as another comparative example. The remaining water discharge process of the bar graph C was performed under the same conditions as those of the remaining water discharge process of the bar graph A, except opening the exhaust valve 43.

As shown by the bar graph A, performing the remaining water discharge process once enables the water which has not been discharged out by the first purge but remains in the power generation area GA to be discharged out of the power generation area GA. The discharge amount of water shown by the bar graph A is almost half the discharge amount of water when the purge gas is flowed along the direction of gravity in the power generation area GA (bar graph B), but is still a sufficient amount to suppress the blockage of the cathode gas flow path 12. Additionally, the discharge amount of water shown by the bar graph A is more than twice the discharge amount of water when the pressure is released in the direction reverse to the direction of gravity to discharge the remaining water (bar graph C).

As described above, the fuel cell system 100 of the embodiment performs once the remaining water discharge process having small energy consumption, along with a purge, after the operation stop of the fuel cell 10. This effectively moves out the water remaining in the power generation area GA of the fuel cell 10. Accordingly, this efficiently suppresses deterioration of the starting performance of the fuel cell 10 by freezing of such remaining water.

B. Second Embodiment

Figure 8:
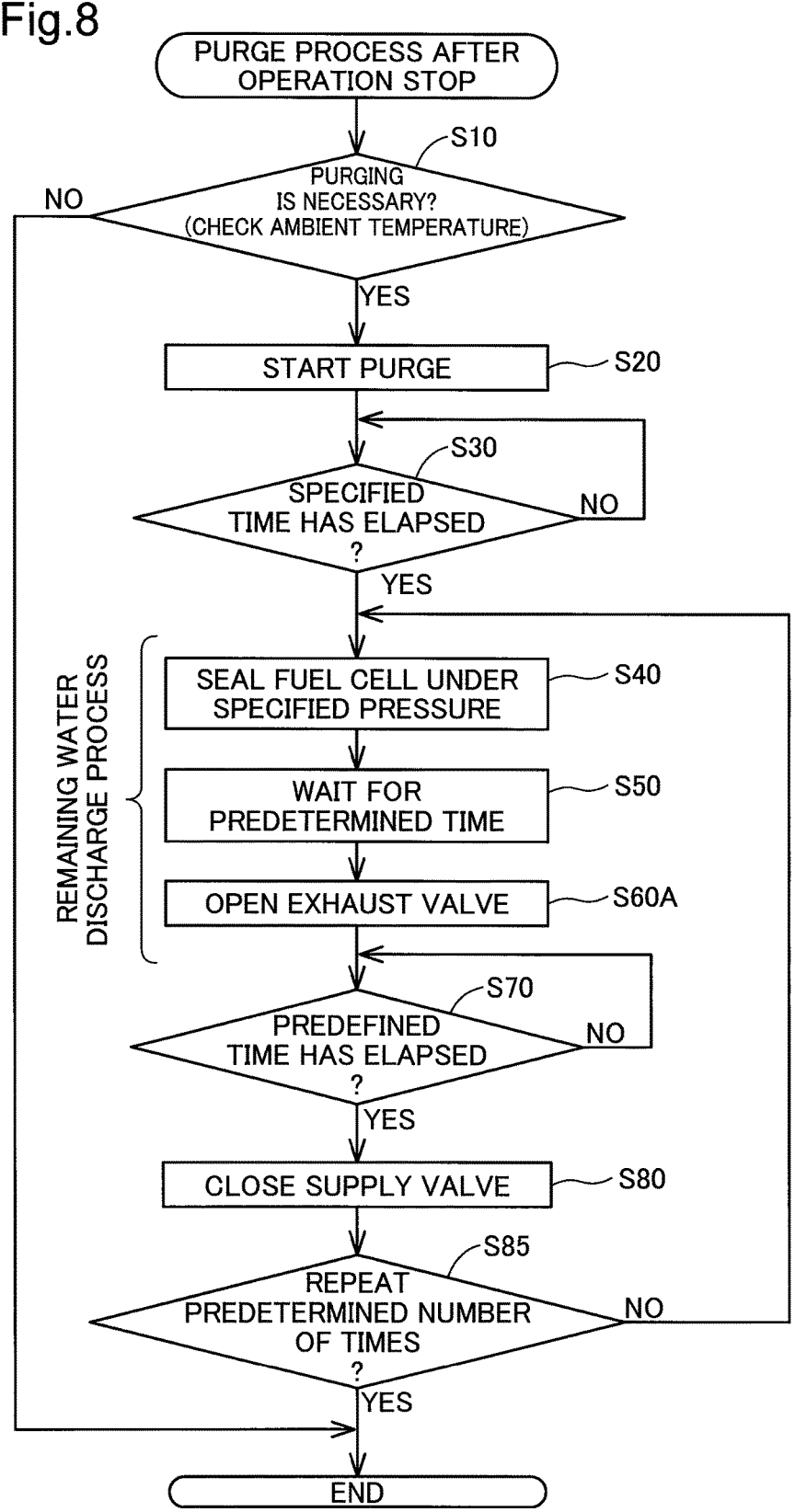
FIG. 8 is a chart showing a procedure of a purge process according to a second embodiment.

FIG. 8 is a flowchart showing a procedure of a purge process according to a second embodiment of the invention. The procedure of FIG. 8 is similar to the procedure of FIG. 5, except replacement of step S60 with step S60A and addition of step S85. The configuration of a fuel cell system according to the second embodiment is similar to that of the fuel cell system 100 according to the first embodiment (FIG. 1).

In the fuel cell system of the second embodiment, a remaining water discharge process after a purge opens the exhaust valve 43 on the cathode off-gas piping 41 (step S60A) and releases the internal pressure of the fuel cell 10 to the cathode off-gas piping 41 to discharge water upward in the direction of gravity. The procedure terminates the purge process after repeating this remaining water discharge process a predetermined number of times (step S85).

As described above with reference to FIG. 7, the remaining water is discharged from the power generation area GA by the remaining water discharge process which opens the exhaust valve 43 and releases the pressure of the fuel cell 10 to the cathode off-gas piping 41 on the upper side in the direction of gravity (bar graph C). The discharge amount of water is, however, less than the discharge amount of water by the remaining water discharge process which opens the supply valve 34 and releases the pressure of the fuel cell 10 to the cathode gas piping 31 on the lower side in the direction of gravity (bar graph A). The fuel cell system of the second embodiment accordingly repeats the remaining water discharge process the predetermined a plural number of times, in order to effectively reduce the water accumulated inside of the fuel cell 10.

As described above, like the first embodiment, the fuel cell system of the second embodiment effectively reduces the water content remaining inside of the fuel cell 10. Additionally, in the fuel cell system of the second embodiment, the remaining water discharge process discharges water toward the outlet of the power generation area GA. This enables the water to be efficiently discharged through the cathode off-gas piping 41 on a restart of the fuel cell 10.

C. Third Embodiment

Figure 9:
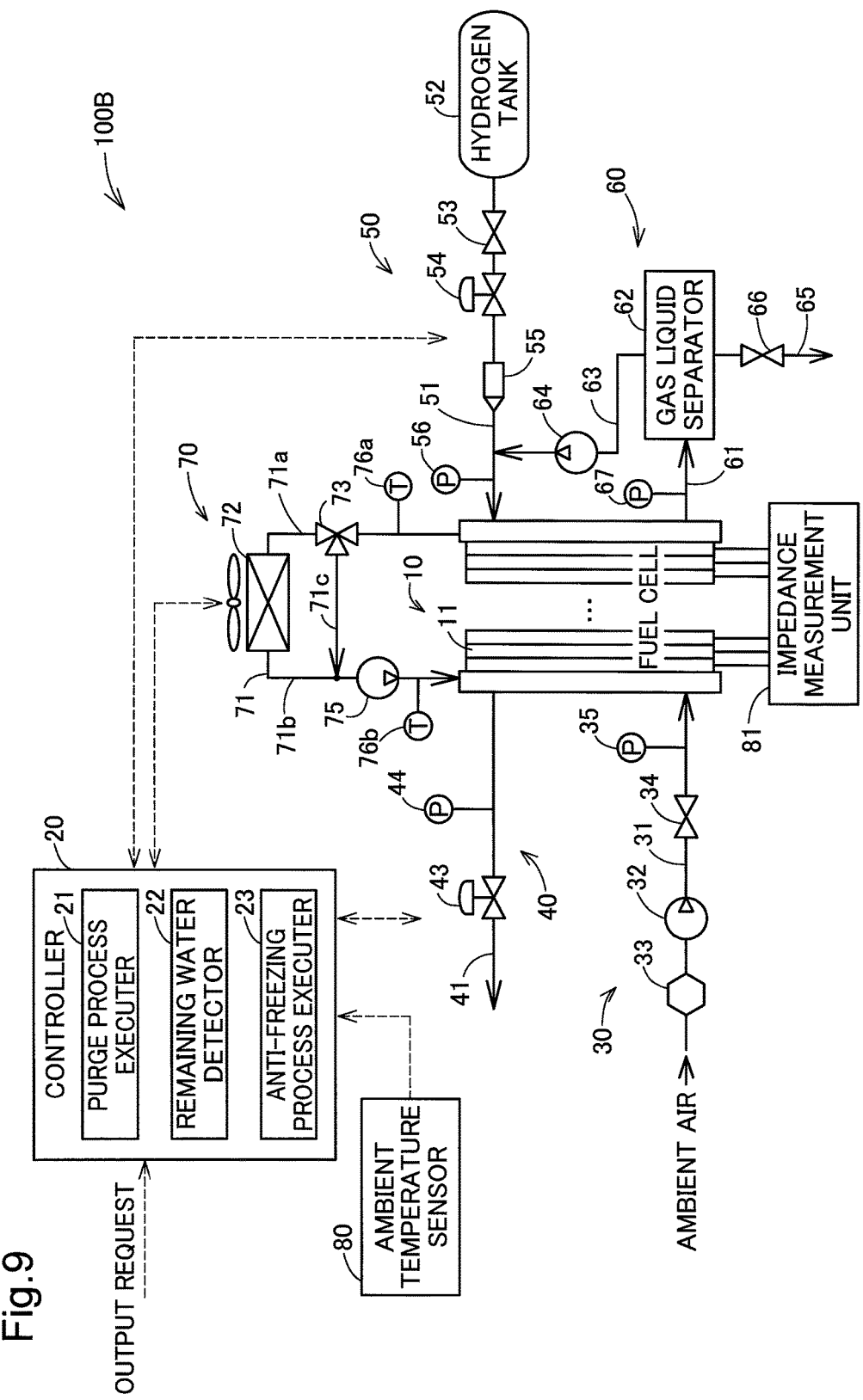
FIG. 9 is a schematic diagram illustrating the configuration of a fuel cell system according to a third embodiment.

FIG. 9 is a schematic diagram illustrating the configuration of a fuel cell system 100B according to a third embodiment of the invention. The configuration of FIG. 9 is similar to the configuration of FIG. 1, except connection of an impedance measurement unit 81 to the fuel cell 10 and addition of the functions of the controller 20 as a remaining water detector 22 and an anti-freezing process executer 23.

The impedance measurement unit 81 measures the resistance of each unit cell 11 in the fuel cell 10 after the operation stop by the AC impedance method and outputs the measurement result to the controller 20. The remaining water detector 22 detects the water content inside of each unit cell 11 by using the measurement result of the impedance measurement unit 81 and a predetermined relationship between the resistance of each unit cell 11 and the water content inside of each unit cell 11. The anti-freezing process executer 23 performs an anti-freezing process (described later) to prevent the fuel cell 10 from being frozen.

Figure 10:
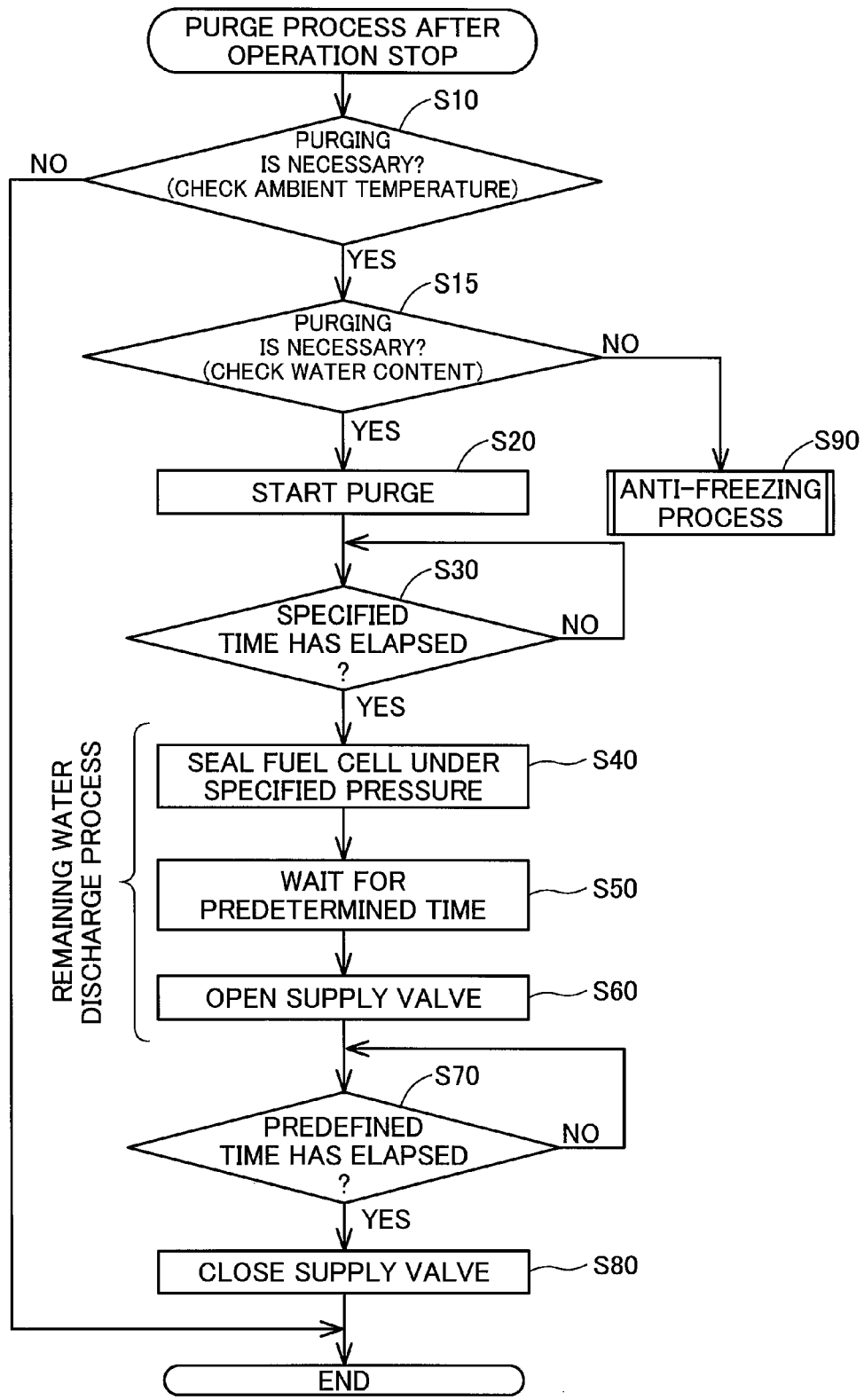
FIG. 10 is a chart showing a procedure of a purge process according to the third embodiment.

FIG. 10 is a flowchart showing a procedure of a purge process performed after the operation stop of the fuel cell 10 in the fuel cell system 100B of the third embodiment. The procedure of FIG. 10 is similar to the procedure of FIG. 5, except addition of a decision process of step S15 and an anti-freezing process of step S90.

At step S10, the purge process executer 21 performs an ambient temperature check as a first determination process to determine the necessity or unnecessity to purge the fuel cell 19. More specifically, as described in the first embodiment, the purge process executer 21 determines whether the ambient temperature is likely to reach a sub-zero temperature, based on the current ambient temperature. When it is determined at step S10 that the ambient temperature is higher than the specified temperature and is unlikely to reach a sub-zero temperature, the purge process executer 21 terminates this purge process without purging the fuel cell 10.

When it is determined at step S10 that the ambient temperature is equal to or lower than the specified temperature and is likely to reach a sub-zero temperature, on the other hand, the purge process executer 21 performs a second determination process to determine the necessity or unnecessity of purging at step S15. In the case that there is a low water content inside of the fuel cell 10, purging of the fuel cell 10 discharges only little amount of water and is accordingly inefficient. The fuel cell system 100 of the third embodiment accordingly determines the necessity or unnecessity of purging, based on the water content remaining inside of the fuel cell 10 at step S15.

The purge process executer 21 uses the water content inside of each unit cell 11 detected by the remaining water detector 22 and determines whether the water content in each unit cell 11 is greater than a predetermined level, i.e., whether the water content dischargeable by purging remains in each unit cell 11. More specifically, the purge process executer 21 may determine the high necessity of purging, for example, when at least one unit cell 11 has the detected water content greater than the predetermined level.

When it is determined at step S15 that the water content dischargeable by purging remains in the fuel cell 10, the purge process executer 21 purges the fuel cell 10 at steps S20 and S30. After purging at steps S20 and S30, the procedure performs a remaining water discharge process similar to that described in the first embodiment and terminates the purge process (steps S40 to S80).

When it is determined at step S15 that the detected water content is less than the water content dischargeable by purging, on the other hand, the purge process executer 21 does not perform a purge but the anti-freezing process executer 23 starts an anti-freezing process at step S90. The anti-freezing process at step S90 is performed to suppress the ambient temperature from reaching a sub-zero temperature during operation stop of the fuel cell 10 and from freezing the water inside of the fuel cell 10, which deteriorates the starting performance of the fuel cell 10.

Figure 11:
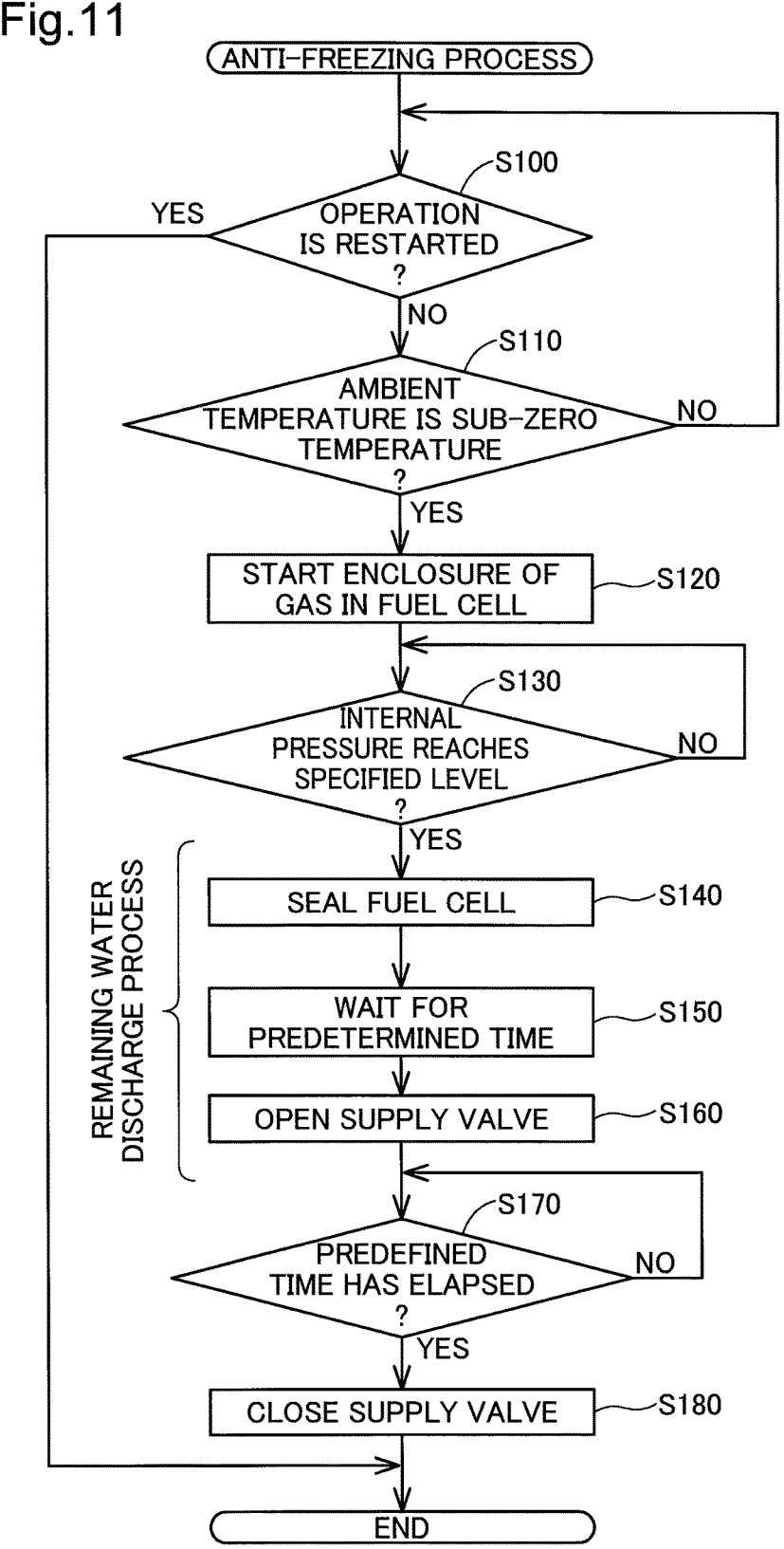
FIG. 11 is a chart showing a procedure of an anti-freezing process.

FIG. 11 is a flowchart showing a procedure of the anti-freezing process. Even when it is determined at step S15 in the purge process (FIG. 10) that the water content dischargeable by purging does not remain inside of the fuel cell 10, there is still a possibility that the water remaining in the power generation area GA is frozen to block the diffusion pathway of the gas. This anti-freezing process performs a remaining water discharge process similar to that performed in the purge process, so as to move the water, which is likely to block the diffusion pathway of the gas in the power generation area GA, out of the power generation area GA and thereby suppress the water in the power generation area GA from being frozen.

The anti-freezing process executer 23 controls the ambient temperature sensor 80 to detect the ambient temperature at regular intervals until a restart of operation of the fuel cell 10 (steps S100 and S110). When the ambient temperature reaches a sub-zero temperature or when the ambient temperature decreases to a temperature higher than the freezing point by about several degrees Celsius, the processing of and after step S120 is performed. In response to detection of a restart request of the fuel cell 10, the anti-freezing process is terminated.

At step S120, the anti-freezing process executer 23 starts enclosure of the compressed air into the fuel cell 10. More specifically, the anti-freezing process executer 23 opens the supply valve 34 on the cathode gas piping 31 with keeping the exhaust valve 43 on the cathode off-gas piping 41 closed and actuates the air compressor 32. When it is detected at step S130 that the internal pressure of the fuel cell 10 reaches a specified level, the anti-freezing process executer 23 performs a remaining water discharge process of steps S140 to S160.

At step S140, the anti-freezing process executer 23 stops the operation of the air compressor 32 and closes the supply valve 34 to seal the fuel cell 10. It is preferable to actuate the air compressor 32 at steps S120 to S140 with the smaller energy than the energy consumed for purging.

At step S150, the anti-freezing process executer 23 waits for a predetermined time with keeping the internal pressure of the fuel cell 10. At step S160, the anti-freezing process executer 23 opens the supply valve 34 to release the pressure to the cathode gas piping 31 and thereby move the water in the power generation area GA to the supply manifold M1. The anti-freezing process executer 23 closes the supply valve 34 on elapse of a predefined time (for example, about several seconds) since the release of the pressure at step S160 (steps S170 and S180) and then terminates the anti-freezing process.

As described above, when the water content remaining inside of the fuel cell 10 is equal to or greater than the predetermined level, the fuel cell system of the third embodiment performs both purging and the remaining water discharge process. When the remaining water content is less than the predetermined level, on the other hand, the fuel cell system of the third embodiment performs only the remaining water discharge process. This suppresses reduction of the system efficiency by unnecessary purging, while effectively reducing the water content remaining inside of the fuel cell 10 after the operation stop. This efficiently suppresses deterioration of the starting performance of the fuel cell 10.

D. Modifications

The present invention is not limited to the embodiments or aspects described above but may be implemented by various other aspects within the scope of the invention. Some examples of possible modifications are given below.

D1. Modification 1

In the configuration of the above embodiments, the fuel cell 10 is arranged such that the supply manifold M1 on the cathode side faces downward in the direction of gravity and the exhaust manifold M2 on the cathode side faces upward in the direction of gravity. The arrangement of the fuel cell 10 is, however, not limited to this orientation, but the fuel cell 10 may be arranged in another orientation.

D2. Modification 2

In the above embodiments, the purging prior to the remaining water discharge process causes the compressed air as the purge gas to be flowed in the direction reverse to the direction of gravity in the power generation area GA. Alternatively, the purging prior to the remaining water discharge process may cause the purge gas to be flowed along the direction of gravity in the power generation area GA. Even in the latter case, performing the remaining water discharge process after the purging enables the water that has not been discharged by the purge to be moved out of the power generation area GA.

D3. Modification 3

In the above embodiments, the remaining water discharge process is performed for the cathode side of the fuel cell 10. The remaining water discharge process may alternatively be performed for the anode side of the fuel cell 10.

D4. Modification 4

The first embodiment described above determines the necessity or unnecessity of purging, based on the ambient temperature at step S10. The necessity or unnecessity of purging may, however, be determined, based on another criterion. For example, the criterion may be the water content remaining inside of the fuel cell 10 after the operation stop or may be the record of the operating state of the fuel cell 10, such as the amount of power generation during operation of the fuel cell 10.

D5. Modification 5

The second embodiment described above repeats the remaining water discharge process of opening the exhaust valve 43 to release the pressure of the fuel cell 10 to the cathode off-gas piping 41, a plurality of times. The above second embodiment may alternatively repeat the remaining water discharge process identical with that of the first embodiment, i.e., the process of opening the supply valve 34 to release the pressure of the fuel cell 10 to the cathode gas piping 31, a plurality of times.

D6. Modification 6

In the third embodiment described above, the purge process executer 21 detects the water content remaining inside of the fuel cell 10, based on the measurement value of the impedance measurement unit 81. The purge process executer 21 may, however, detect the water content remaining inside of the fuel cell 10 by another method. For example, the purge process executer 21 may calculate the water content remaining inside of the fuel cell 10, based on the amount of produced water according to the amount of power generation by the fuel cell 10 and the discharge amount of liquid water from the fuel cell 10.

D7. Modification 7

The third embodiment described above performs the remaining water discharge process of opening the supply valve 34 to release the pressure to the supply manifold M1. The remaining water discharge process of the third embodiment may alternatively open the exhaust valve 43 to release the pressure to the exhaust manifold M2, like the second embodiment. The above third embodiment may repeat the remaining water discharge process a plurality of times, like the second embodiment.

REFERENCE SIGNS LIST

1 Electrolyte membrane
2 Cathode (first electrode)
3 Anode (second electrode)
5 Membrane electrode assembly
10 Fuel cell 11 Unit cell
12 Cathode gas flow path
13 Anode gas flow path
14 Connection path
20 Controller
21 Purge process executer
22 Remaining water detector
23 Anti-freezing process executer
30 Cathode gas supply system
31 Cathode gas piping
32 Air compressor
33 Air flow meter
34 Supply valve
40 Cathode gas exhaust system
41 Cathode off-gas piping
43 Exhaust valve
44 Pressure measurement unit
50 Anode gas supply system
51 Anode gas piping
52 Hydrogen tank
53 On-off valve
54 Regulator
55 Hydrogen supply device
56 Pressure measurement unit
60 Anode gas circulation and exhaust system
61 Anode off-gas piping
62 Gas liquid separator
63 Anode gas circulation piping
64 Hydrogen circulation pump
65 Anode water discharge piping
66 Drain valve
67 Pressure measurement unit
70 Cooling medium circulation and supply system
71 Cooling medium piping
71a Upstream-side pipe
71b Downstream-side pipe
71c Bypass pipe
72 Radiator
73 Three-way valve
75 Cooling medium circulation pump
76a, 76b Cooling medium temperature measurement units
80 Ambient temperature sensor
81 Impedance measurement unit
100, 100B Fuel cell systems
GA Power generation area
M Water
M1 Supply manifold
M2 Exhaust manifold
M3 Supply manifold
M4 Exhaust manifold

The invention claimed is:

1. A fuel cell system, comprising:
a fuel cell configured to have: a supply gas manifold; an exhaust gas manifold; and a power generation area where a gas flow path connected with the supply gas manifold and with the exhaust gas manifold is arranged, and arranged such that an upstream side of the gas flow path is located on a downward side in the direction of gravity and a downstream side of the gas flow path is located on an upward side in the direction of gravity, where the supply gas manifold is located on a lower side in the direction of gravity and the exhaust gas manifold is located on an upper side in the direction of gravity;
a gas supplier configured to cause a gas to be flowed into the supply gas manifold;
a supply valve configured to seal the supply gas manifold;
an exhaust valve configured to seal the exhaust gas manifold; and
a controller configured to open and close the supply valve and the exhaust valve, wherein
the controller is programmed to perform a remaining water discharge process which closes the supply valve and the exhaust valve after operation stop of the fuel cell, so as to seal the gas from the gas supplier in the fuel cell under a specified pressure, and subsequently opens the supply valve after waiting for a predefined time, so as to move water remaining in the gas flow path of the power generation area toward the supply gas manifold.

2. The fuel cell system according to claim 1,
wherein the controller performs a purge process of purging inside of the fuel cell with the gas from the gas supplier after the operation stop of the fuel cell, and
the controller performs the remaining water discharge process after the purge process.

3. The fuel cell system according to claim 2, further comprising:
a water content detector configured to detect a water content remaining inside of the fuel cell on the operation stop, wherein
the controller determines whether (i) both the purge process and the remaining water discharge process are to be performed or (ii) only the remaining water discharge process is to be performed without the purge process, according to the detected water content.

4. The fuel cell system according to claim 1,
wherein the controller repeats the remaining water discharge process a plurality of times.

5. A control method of a fuel cell system, the fuel cell system comprising a fuel cell configured to have: a supply gas manifold; an exhaust gas manifold; and a power generation area where a gas flow path connected with the supply gas manifold and with the exhaust gas manifold is arranged, and arranged such that an upstream side of the gas flow path is located on a downward side in the direction of gravity and a downstream side of the gas flow path is located on an upward side in the direction of gravity, where the supply gas manifold is located on a lower side in the direction of gravity and the exhaust gas manifold is located on an upper side in the direction of gravity,
the control method comprising the steps of:
(a) sealing the supply gas manifold and the exhaust gas manifold after operation stop of the fuel cell and waiting for a predefined time with keeping inside of the fuel cell at a specified pressure; and
(b) releasing the supply gas manifold, so as to move water remaining in the gas flow path of the power generation area toward the supply gas manifold.

\* \* \* \* \*